A. H. CRISSEY.
FARM GATE.
APPLICATION FILED JAN. 20, 1921.
1,414,863.
Patented May 2, 1922.
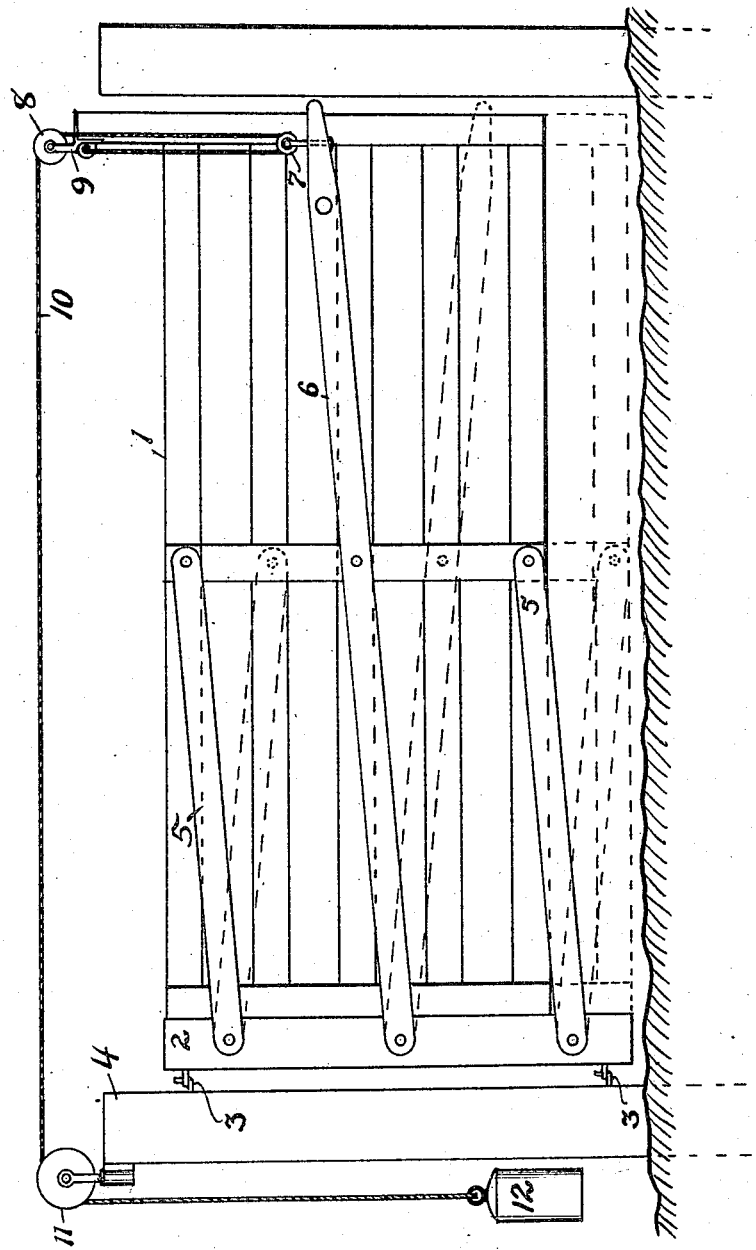
Aaron H. Crissey, Inventor
By H. G. Burns, Attorney

UNITED STATES PATENT OFFICE.

AARON H. CRISSEY, OF LANSING, MICHIGAN.

FARM GATE.

1,414,863. Specification of Letters Patent. Patented May 2, 1922.

Application filed January 20, 1921. Serial No. 438,720.

*To all whom it may concern:*

Be it known that I, AARON H. CRISSEY, a citizen of the United States of America, and resident of Lansing, in the county of Ingham and State of Michigan, have invented certain new and useful Improvements in Farm Gates, of which the following is a specification.

This invention relates to improvements in farm gates of the hinged type and the object thereof is to provide a gate adapted to be swung upon hinges and also to be raised and lowered. Also, another object is to afford a counter balance for the gate to facilitate raising and lowering it as well as preventing it from sagging.

The objects of the invention are accomplished by the construction illustrated in the accompanying drawing which is a side elevation of a gate embodying the invention, the gate being shown in its uppermost position.

The characters of reference hereinafter appearing refer to parts designated by corresponding characters on the drawing.

The invention is comprised of a gate proper 1 mounted in connection with a swinging post 2 which is mounted on hinges 3 that are supported by a gate post 4, the gate being connected with the swinging post 2 by means of parallel bars 5. Each bar 5 is pivoted at its rear end to the swinging post 2 and at its opposite end to the gate in line with the vertical center thereof, so that the gate 1 may be moved vertically as the bars swing upon their pivotal connections.

A lever 6 has pivotal connection at its rear end with the swinging post 2, and at its middle with the gate 1 at a point in line with its vertical center, the lever being positioned in parallel relation with the bars 5 so as the outer end of the lever is vertically moved the gate will be correspondingly raised or lowered. The outer end of the lever 6 has connection with a weighted tackle rig comprised of a pulley 7 on the lever and a pulley 8 supported in a bracket 9 mounted on the gate 1 at a point above the outer end of the lever 6, there being a cable 10 attached at one end to the bracket 9 and extending around the pulleys 7 and 8 and also over an idler 11 which is pivotally supported at the upper end of the fence post 4. A weight 12 is attached to the cable to hold the latter constantly in tension so that the outer end of the lever will be supported with sufficient force to sustain the gate in its various vertical positions.

In the operation of the invention, the gate may be swung bodily together with the swinging post 2 upon the hinges 3 as an ordinary gate is swung to and fro. The gate, however, is sustained vertically by the lever 6, the latter being supported at its outer end by the tackle rig, thus sagging of the gate is obviated. By manually lowering or raising the outer end of the lever 6, the gate is correspondingly caused to swing vertically upon its pivotal connections with the bars 5 and the lever 6.

By the use of the gate thus constructed, vertical adjustments of the gate may be made so as to clear the ground and avoid obstructions of snow when the gate is swung horizontally or to be raised so as to permit passage of small stock.

What I claim is:

In a farm gate, a gate post, a swinging post having hinged connection with the gate post; a gate proper; a pair of parallel bars each of which has pivotal connection at one end with the swinging post, and at the opposite end with the gate at a point in line with the vertical center thereof; a lever having pivotal connection with the swinging post at one end, and at its middle with the gate at a point in line with the vertical center thereof; and a tackle rig in connection with the gate and lever for counterbalancing the gate.

In testimony whereof I affix my signature, in presence of two witnesses.

AARON H. CRISSEY.

Witnesses:
 MATILDA METTLER,
 W. G. BURNS.